(12) United States Patent
Savvides et al.

(10) Patent No.: US 11,748,853 B2
(45) Date of Patent: Sep. 5, 2023

(54) METHOD AND ARCHITECTURE FOR BLIND IMAGE DECONVOLUTION

(71) Applicant: CARNEGIE MELLON UNIVERSITY, Pittsburgh, PA (US)

(72) Inventors: Marios Savvides, Wexford, PA (US); Raied Aljadaany, Pittsburgh, PA (US); Dipan Kumar Pal, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 219 days.

(21) Appl. No.: 17/241,379

(22) Filed: Apr. 27, 2021

(65) Prior Publication Data

US 2021/0334939 A1 Oct. 28, 2021

Related U.S. Application Data

(60) Provisional application No. 63/016,734, filed on Apr. 28, 2020.

(51) Int. Cl.
| | |
|---|---|
| *G06T 5/00* | (2006.01) |
| *G06T 5/50* | (2006.01) |
| *G06T 11/00* | (2006.01) |
| *G06T 1/20* | (2006.01) |

(52) U.S. Cl.
CPC .............. *G06T 5/002* (2013.01); *G06T 1/20* (2013.01); *G06T 5/50* (2013.01); *G06T 11/005* (2013.01); *G06T 11/006* (2013.01); *G06T 2207/20024* (2013.01); *G06T 2207/20081* (2013.01); *G06T 2207/20084* (2013.01); *G06T 2207/20182* (2013.01); *G06T 2211/424* (2013.01)

(58) Field of Classification Search
CPC .. G06T 5/002; G06T 1/20; G06T 5/50; G06T 11/005; G06T 11/006; G06T 2207/20024; G06T 2207/20081; G06T 2207/20084; G06T 2207/20182; G06T 2211/424; G06T 2207/20201; G06T 5/003
See application file for complete search history.

(56) References Cited

U.S. PATENT DOCUMENTS

| | | | |
|---|---|---|---|
| 2018/0197278 A1* | 7/2018 | Lee ...................... | G06V 10/443 |
| 2021/0049447 A1* | 2/2021 | Navarrete Michelini | ................... G06N 3/048 |
| 2021/0319534 A1* | 10/2021 | Liu ....................... | G06T 3/4061 |

OTHER PUBLICATIONS

Eckstein, Jonathan, and Dimitri P. Bertsekas. "On the Douglas-Rachford splitting method and the proximal point algorithm for maximal monotone operators." Mathematical Programming 55.1 (1992): 293-318. (Year: 1992).*

Kokkinos, Filippos, and Stamatis Lefkimmiatis. "Iterative residual cnns for burst photography applications." Proceedings of the IEEE/CVF Conference on Computer Vision and Pattern Recognition. 2019. (Year: 2019).*

(Continued)

*Primary Examiner* — Bobbak Safaipour
*Assistant Examiner* — Benedict E Lee
(74) *Attorney, Agent, or Firm* — KDW Firm PLLC

(57) ABSTRACT

Disclosed herein is a method for performing blind deconvolutions of blurred images. The method approximates the proximal operators for the data fidelity term and the prior term of a minimization function using trained neural networks and solves the minimization using iterations of the Douglas-Rachford algorithm.

18 Claims, 7 Drawing Sheets
(6 of 7 Drawing Sheet(s) Filed in Color)

(56) References Cited

OTHER PUBLICATIONS

Kokkinos, Filippos, and Stamatios Lefkimmiatis. "Iterative joint image demosaicking and denoising using a residual denoising network." IEEE Transactions on Image Processing 28.8 (2019): 4177-4188. (Year: 2019).*

Huang, Jianqiang, Kai Li, and Xiaoying Wang. "Single image super-resolution reconstruction of enhanced loss function with multi-gpu training." 2019 IEEE Intl Conf on Parallel & Distributed Processing with Applications (Year: 2019).*

Weng, Lilian. "From gan to wgan." arXiv preprint arXiv:1904. 08994 (2019) (Year: 2019).*

Aljadaany, R., et al., "Proximal Splitting Networks for Image Restoration", Image Analysis and Recognition. ICIAR 2019. Lecture Notes in Computer Science, vol. 11662. 13 pages.

* cited by examiner

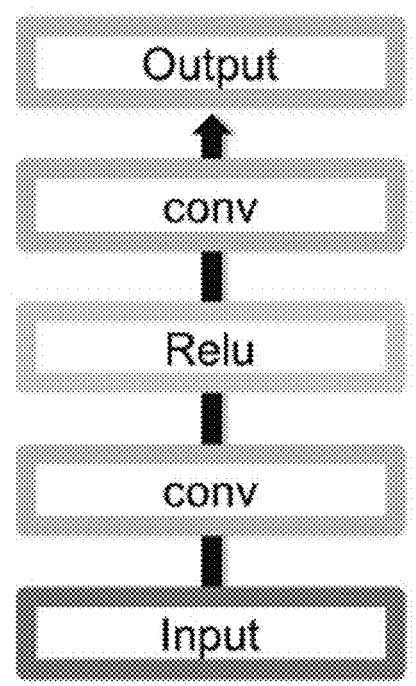
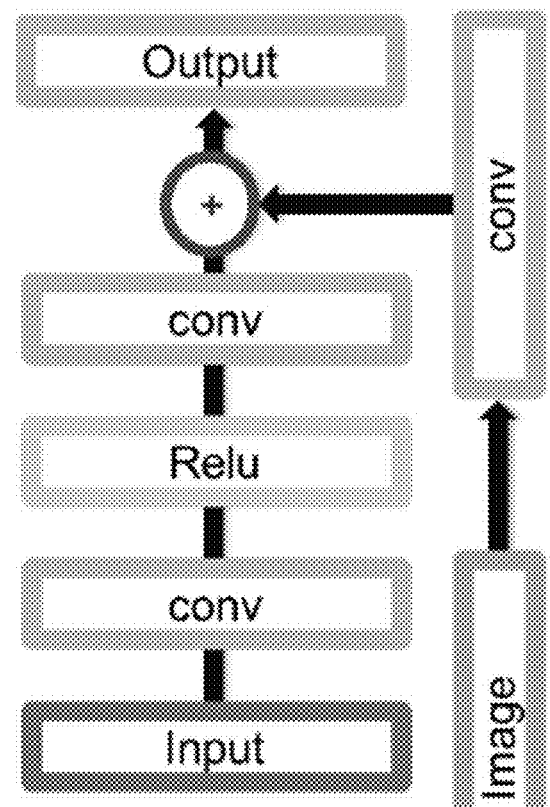
FIG. 3(A)
FIG. 3(B)

METHOD AND ARCHITECTURE FOR BLIND IMAGE DECONVOLUTION

RELATED APPLICATIONS

This application claims the benefit of U.S. Provisional Patent Application No. 63/016,734, filed Apr. 28, 2020, the contents of which are incorporated herein in their entirety.

BACKGROUND

Blind deconvolution problems are inverse problems in image processing in which a corruption of an image, for example, a blurring effect, is inverted to recover a clear image. A large part of the challenge is the fact that the kernel that caused the corruption may be unknown. A corrupted image y can be generated via convolving a clear image x with a kernel k. This can be written as:

$$y = k*x + \in \quad (1)$$

where:
$\in$ is additive zero-mean white Gaussian noise.

The problem of recovering the clean image x is an ill-posed inverse problem. One approach to solve it is by assuming some prior (or a set of priors) on the image space and having the kernel k being provided or estimated. Thus, the clean image x can be approximated by solving the following optimization problem:

$$x^* = \underset{x}{\arg\min} \|y - k*x\|_2^2 + g(x) \quad (2)$$

where:
$\|y-k*x\|_2^2$ is a data fidelity term; and
g is an operator that defines some prior on the image space, referred to herein as the image prior (e.g., the $l_1$ norm may be used to promote sparsity).

Image priors are common in signal and image processing tasks such as inverse problems, and considerable effort has been spent in hand designing suitable priors for signals. However, the optimization problem in Eq. (2) is useful only if good estimates are available for both the image prior and the blurring kernel. Image recovery algorithms based on the optimization problem in Eq. (2) fail when the solution space invoked by the assumed prior does not contain good approximations of the real data. This also happens when the estimated kernel is not accurate.

The data fidelity term in Eq. (2), in general, can be denoted by $f(y, x, k)$ to emphasize its dependence on k. In accordance with the blind deconvolution problem, k is not known, which makes $f(y, x, k)$ difficult to estimate, let alone optimize. A reasonable, and at times useful, assumption addressing this is that k is a random variable. Now, the data fidelity term can be computed via marginalizing over the random variable k, which makes it a function of y and x exclusively. This eliminates the need to know k. The term $f(y, x)$ now only measures how likely it is to obtain the corrupted image y given a clean image x independent of k, which makes it a good candidate as an objective to be maximized. This approach, however, presents a major issue, as it requires that the prior density function of k be known. Nonetheless, in the general case, the overall optimization problem including an image prior term can be written as:

$$x^* = \underset{x}{\arg\min} f(x, y) + g(x) \quad (3)$$

There are two main challenges in utilizing the previous optimization formulation for deblurring and image recovery in general. The first challenge is that it is not trivial to correctly model the image prior using a hand-crafted function. Expressivity of the prior is critical in effective recovery of the image. If the prior is incorrect or not expressive enough, the image recovered can potentially have major artifacts. The second challenge is that of modelling the prior distribution of the blurring kernel (e.g., de-focusing kernels have a distribution that is different from motion kernels) along with the exact noise distribution. This in turn leads to difficulties in modelling the data fidelity function itself. Current approaches assume useful functions as data fidelity terms despite limited expressivity. Some approaches represent the kernel distribution with the Laplacian distribution because the kernel is assumed to have a sparse representation (e.g., motion kernels). Nonetheless, a clean image will not be recovered correctly when the assumed prior over the blurring kernel is not expressive enough. Even in cases where the prior distribution of the kernel is known, it is difficult to find a closed form of $f(x, y)$, such as in cases when the prior distribution is not a conjugate prior of the likelihood distribution. This makes hand-crafting a good objective for data fidelity a difficult task.

SUMMARY OF THE INVENTION

Disclosed herein is a method and architecture which does not require an estimate of the blurring kernel and is nevertheless able to invert the effects of the blurring in blind image recovery tasks. The image recovery problem typically has two terms, a data fidelity term (for faithful reconstruction) and an image prior (for realistic looking reconstructions). The method of the present invention uses Douglas-Rachford (DR) iterations to solve this problem because it is a more generally applicable optimization procedure than methods such as the proximal gradient descent algorithm.

Two proximal operators originate from these iterations, one for the data fidelity term and one for the image prior term. Because it is non-trivial to design a hand-crafted function to represent these proximal operators which would work with real-world image distributions, in the method of the present invention, both of these proximal operators are approximated using deep neural networks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-3B show graphical representations of CNNs used to approximate the proximal operators for the prior term ($\Gamma_g$) and the data fidelity term ($\Gamma_f$), respectively.

DETAILED DESCRIPTION

Herein is disclosed a method of deconvolving a corrupted image when the burring kernel is unknown by modelling the proximal operators resulting from the data fidelity term and the image prior term with deep neural networks. The modelling of the proximal operators of both the image prior and the data fidelity terms with deep networks is a novel approach. Learning the parameters of these networks allows the learning of the data fidelity and the image prior terms indirectly.

In the usual case, it is difficult to find a closed form solution of Eq. (3). Iterative approaches, such as gradient descent methods and proximal decent methods, are usually used to solve these problems. However, for the optimization problem in Eq. (3), both gradient decent-based and proximal descent-based methods require some conditions. For example, one or both of the image prior term and the data fidelity term need to be differentiable. For the Douglas-Rachford algorithm, most of these conditions are not required, making it a more generally applicable optimization procedure.

The Douglas-Rachford algorithm, applied to Eq. (3), leads to proximal operators for both the image prior term and the data fidelity term. As discussed, for real-world data, it is difficult to know the exact form of both these terms. In the present invention, deep neural networks are used to model both proximal operators while having a straightforward inference mechanism (a simple forward pass). Neural networks are capable of modelling very large classes of functions. The final architecture learns both the image prior and data fidelity terms in Eq. (3) from the corrupted data without making any assumption about the prior distribution of the images or the blurring kernel. This framework leads to a large network whose overall architecture is inspired from and motivated by the Douglas-Rachford iterations. A correct and sufficient network design following these iterations is critical to high-performing architectures.

Figures 1A, 1B, 1C:
FIGS. 1A-1C are a first example of a comparison between an image processed in accordance with the method of the present invention and an image processed with prior art methods.
Figures 2A, 2B, 2C:
FIGS. 2A-2C are a second example of a comparison between an image processed in accordance with the method of the present invention and an image processed with prior art methods.

FIGS. 1A-1C and FIG. 2A-2C show two examples of a comparison of the results of an image recovery using the method and architecture of the present invention versus a prior art method. FIG. 1(A) and FIG. 2(A) show original blurry images. FIG. 1(B) and FIG. 2(B) show the images as recovered using a prior art method and FIG. 1(C) and FIG. 2(C) show the images recovered using the method of the present invention. The areas of the photos enclosed in the boxes are shown directly below each photo. As can be seen, the method of the present invention recovers sharper images with finer details.

The present invention provides several novel aspects. First, the method and architecture use a network architecture for blind deconvolution based on the Douglas-Rachford optimization algorithm. Second, the proximal operator of both the data fidelity term and the prior term in the Douglas-Rachford algorithm are replaced with two different deep neural networks which firmly satisfy the non-expansive condition. This condition helps the network to be stable during the training and improves the performance during the testing. Further, and unlike in prior art works, the present invention uses multi-channel deep neural networks to solve the Douglas-Rachford iterations while assuming the image as a non-linear weighted sum of an image basis. This provides more theoretical backing to modelling optimization iterations with multi-channeled networks, which was previously lacking.

A brief review of the proximal operator and traditional Douglas-Rachford splitting for optimization is first presented to provide context for a further discussion of the method of the present invention for blind image deconvolution.

Let h: $R^n \rightarrow R$ be a function. The proximal operator of the function h with the parameter $\beta$ is defined as:

$$prox_{h,\beta}(x) = \arg\min_z \beta \|z - x\|_2^2 + h(z) \quad (4)$$

Proximal operators are useful in proximal algorithms such as the alternating direction method of multipliers, the proximal gradient descent method and the Douglas-Rachford algorithm. These algorithms are considered special cases of fixed-point algorithms. It is also interesting to note that $prox_{h,\beta}(x^*)=x^*$ if $x^*$ is a minimizing value of h(x), which is another connection between fixed point algorithms and proximal algorithms. Further, when $prox_{h,\beta}$ is applied repeatedly, it will find a fixed point only if $prox_{h,\beta}$ is firmly non-expansive. $prox_{h,\beta}(x)$ is non-expansive when the following holds $\forall x, y$:

$$\|prox_{h,\beta}(x) - prox_{h,\beta}(y)\|_2^2 \leq \|x-y\|_2^2 \quad (5)$$

This condition is also related to the Lipschitz continuity condition for the proximal operator with the Lipschitz constant being 1 under the Euclidean distance metric.

The Douglas-Rachford algorithm is an iterative scheme to minimize optimization problems where the objective function is split as the sum of two functions as in Eq. (3). It is also a generalization of the well-known proximal gradient descent method. However, the proximal gradient descent method requires that one of the functions in Eq. (3) be differentiable, while this condition in not required in the Douglas-Rachford splitting algorithm.

Douglas-Rachford splitting has been applied to solve nonlinear convex problems before it was improved to deal with non-smooth convex problems. Moreover, Douglas-Rachford algorithms have a global convergence rate for specific classes of structured non-convex optimization problems.

Applying Douglas-Rachford to Eq. (3) leads to the following update steps:

$$q^k = prox_{f,\beta}(x^k)$$

$$z^k = prox_{g,\beta}(2q^k - x^k)$$

$$x^{k+1} = x^k + \lambda_k(z^k - q^k) \quad (6)$$

where:
$q^k$ is the proximal operator of the data fidelity term;
$z^k$ is the proximal operator of the image prior term;
$\lambda_k$ is the step size; and
$\beta > 0$.

In the present invention, the previous Douglas-Rachford update steps are mapped to a deep network architecture that consists of a fixed number of iterations (layers), referred to herein as DR-Blocks. In an embodiment of the invention, for example, 5 layers may be used. The power of deep network-based image recovery is thus combined with the Douglas-Rachford splitting method, referred to herein as DR-Net.

DR-Net models both the image prior and the data fidelity proximal operators using deep neural networks whose parameters are learned from data. This results in improved performance as compared to other hand-crafted approaches which solve the Eq. (3) formulation.

The architecture of the network is based on the updating steps of Eq. (6). The deep networks (specifically, a convolutional neural network) model the prox operators and further satisfy the non-expansive condition. A ConvNet may be used for an image-based application, as the spatial reciprocity property of ConvNet is very useful when dealing with 2D visual data. Although the Douglas-Rachford algorithm applies the same proximal operators (the same function) for all the iterations in Eq. (6), there is a significant advantage to having different proximal operators for every iteration. Thus, in one embodiment of the invention, the same sub-networks for approximating the proximal operators may be used for each DR-Block while, in other embodiments, each DR-Block may use different sub-networks to approximate the proximal operators.

The updating steps of Eqs. (6) show that two distinct proximal operators are needed. The first, $\text{prox}_{f,\beta}(x)$, relates to the data fidelity term, while the second, $\text{prox}_{g,\beta}(x)$, relates to the image prior term. Instead of determining the regularization terms of $f$ and $g$ manually, CNNs are used to learn their corresponding proximal operators. Thus, each proximal operator is represented with a ConvNet, namely $\Gamma_f(x)$ for the data fidelity term and $\Gamma_g(x)$ for the image prior term. In one embodiment, the ConvNet for each proximal operator consists of two convolutional layers separated by a rectified linear unit (ReLU) performing a rectified linear activation function, however, other arrangements may be used. Importantly, the kernel weights of the convolution layers are projected into the unit ball (the length of the vectorized filter weight ≤1). This ensures that the network satisfies the non-expansive condition, as shown below.

FIG. 3(A) shows a graphical representation of $\Gamma_g(X)$, modelling the proximal operator for the image prior term, and FIG. 3(B) shows a graphical representation of $\Gamma_f(x)$, modelling the proximal operator for the data fidelity term in the Douglas-Rachford iterations in Eq. (3). Because the data fidelity proximal operator $\text{prox}_{f,\beta}(x)$ is a function of both the corrupted image and the previous update step, the network $\Gamma_f(x)$ adds the corrupted image after a layer of convolution to the output of the network, as shown in FIG. 3(B). These two CNNs form the main components of each DR-Block.

The non-expansive condition for a function h states that under the Euclidean metric:

$$\|h(x)-h(y)\|_2^2 \le \|x-y\|_2^2 \quad (7)$$

It was discovered that enforcing the non-expansive conditions onto the networks improved the performance and stability of convergence. Enforcing this condition for convolutional layers only requires the projection of each filter weight onto the unit norm ball (i.e., the norm ≤1). The entire ConvNet is firmly non-expansive under this constraint.

Figure 4:
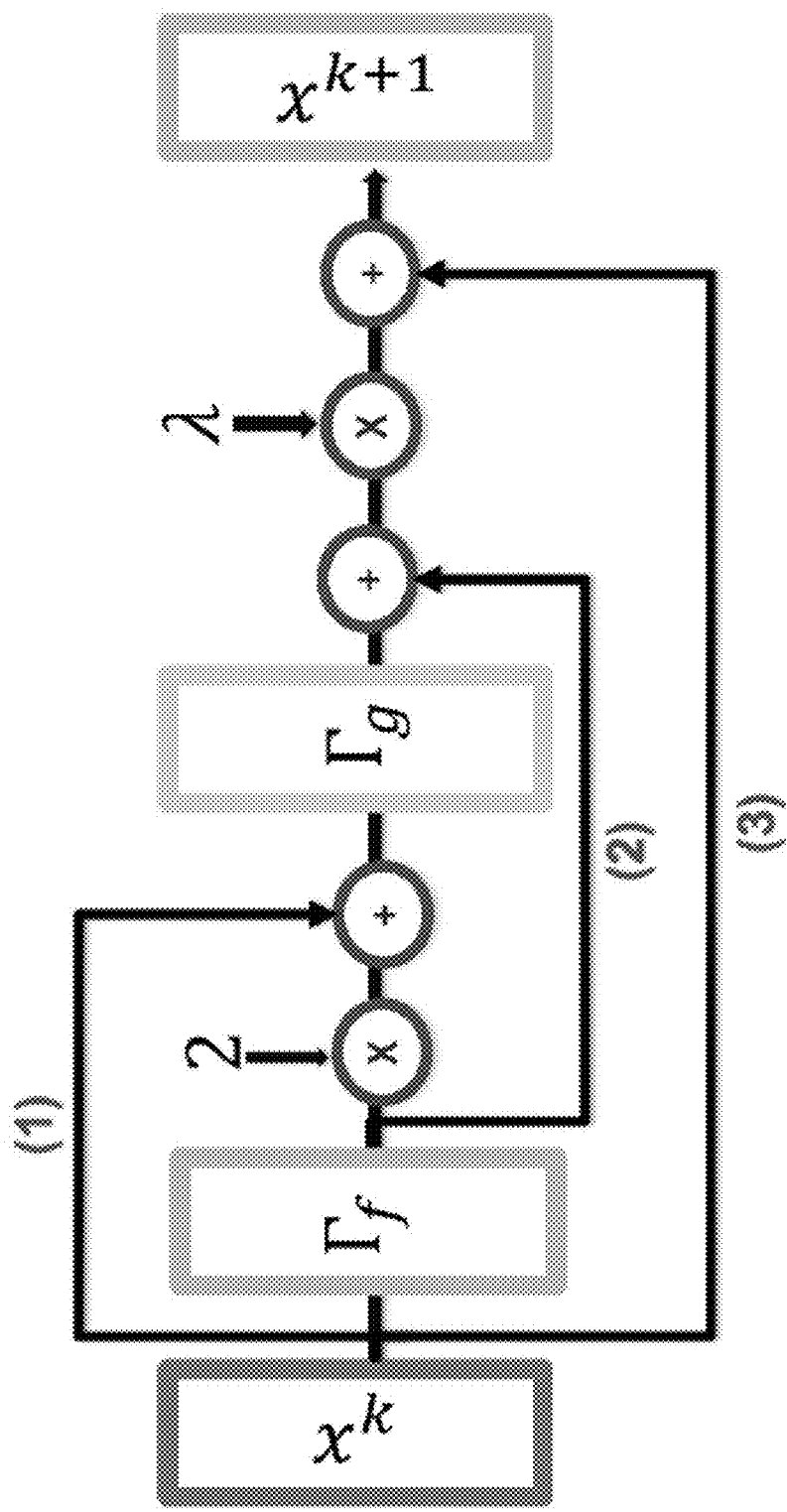
FIG. 4 is a graphical representation of the DR-Block using CNNs to approximate the proximal operators.

Because the proximal operators are replaced with CNNs in the DR-Net, the optimum weights of the convolution layers must be found through an optimization framework expressed in Eq. (8). Here the equality constraints would define the network skip connections. The numbers in parenthesis in FIG. 4 correspond to the nearest skip connection. The optimization function is used to find the weights of the network. FIG. 4 shows a graphical representation of the architecture (as expressed by Eq. (8)) of the DR-Block which is based on the Douglas-Rachford iterations. The networks $\Gamma_f$ and $\Gamma_g$ represent the proximal operators of the data fidelity and image prior terms respectively in the iterations. Each DR-Block computes one iteration of the updates. When multiple DR-Blocks are cascaded, they form the DR-Net. The optimum weights of the convolutional layers are found using:

$$\min_{\Theta,\lambda} L(x_{gt}, x^S)$$

such that:

$$q^k = \Gamma_{f,\Theta}^k(x^k)$$

$$z^k = \Gamma_{g,\Theta}^k(2q^k - x^k)$$

$$x^{k+1} = x^k + \lambda_k(z^k - q^k) \quad (8)$$

where:
L is the loss function;
$x_{gt}$ (ground-truth) is the clear image;
$x^S$ is the recovered image returned by the network after S iterations (layers); and
k=0, . . . , S.

Note that the constraints in this optimization problem represent the Douglas-Rachford iterations. More importantly, the iterations address only single-channel networks, which, in practice, are not expected to have satisfactory performance. Modern neural networks, on the other hand are multi-channeled.

The DR-Blocks can be expended to a multi-channel deep neural network. The approach of the present invention toward this end assumes that the input image is the non-linear sum of some elements in a basis, i.e., $x = h(\Sigma_i \alpha_i \omega_i)$ where $\omega_i$ is the $i^{th}$ element of the basis, h is a reasonable non-linearity and a is the weight vector. The assumption of an image being a combination of a basis is one that has been widely used in PCA, dictionary learning and wavelet bases. The optimization problem in Eq. (3) can be solved in parallel for each element i. Applying the Douglas-Rachford iterations to the new expression for x gives parallel iterations and updates, one for each i. Each of these parallel updates can be explained by a distinct channel in a distinct convolution layer in the deep network, whereas each iteration of all these updates is modelled by each layer in the deep network. This provides a coherent framework to theoretically motivate the more practical multi-channel deep-networks.

Pre-Processing Network—A good initial image $x^0$ helps to improve the performance of the proposed approach. The effect of the initial estimate is less apparent when the problem of interest is convex. However, due to the non-convex nature of the problem (training neural networks is non-convex) the initial estimate will have a more significant effect. In one embodiment of the invention, another network that uses the corrupted image y to provide the initial estimate $x^0$ is used and, in practice, works sufficiently well.

In one embodiment, the proposed initialization network (i.e., the pre-processing network) has a pyramid structure consisting of three stages. In one embodiment, each stage consists of a convolution layer with 3×3 filters followed by a batch normalization layer and a ReLU layer. In one embodiment, the three layers have $$\frac{N}{4}, \frac{N}{2}$$

and N filters respectively. In one embodiment, N may be 256.

Post-Processing Network—Once the updating steps in Eq. (8) are applied for S iterations, the output tensor size is the same as the image spatial size but with N channels. Thus, in one embodiment, a post-processing sub-network is added which converts the tensor into an image. In one embodiment, this sub-network is similar to the pre-processing network with 3×3 filters, but with $$\frac{N}{2}, \frac{N}{4}$$

and c channels, where c is either 1 or 3. Finally, in one embodiment, the output is regulated by a tan h activation layer to force the output between 1 and −1.

Figure 5:
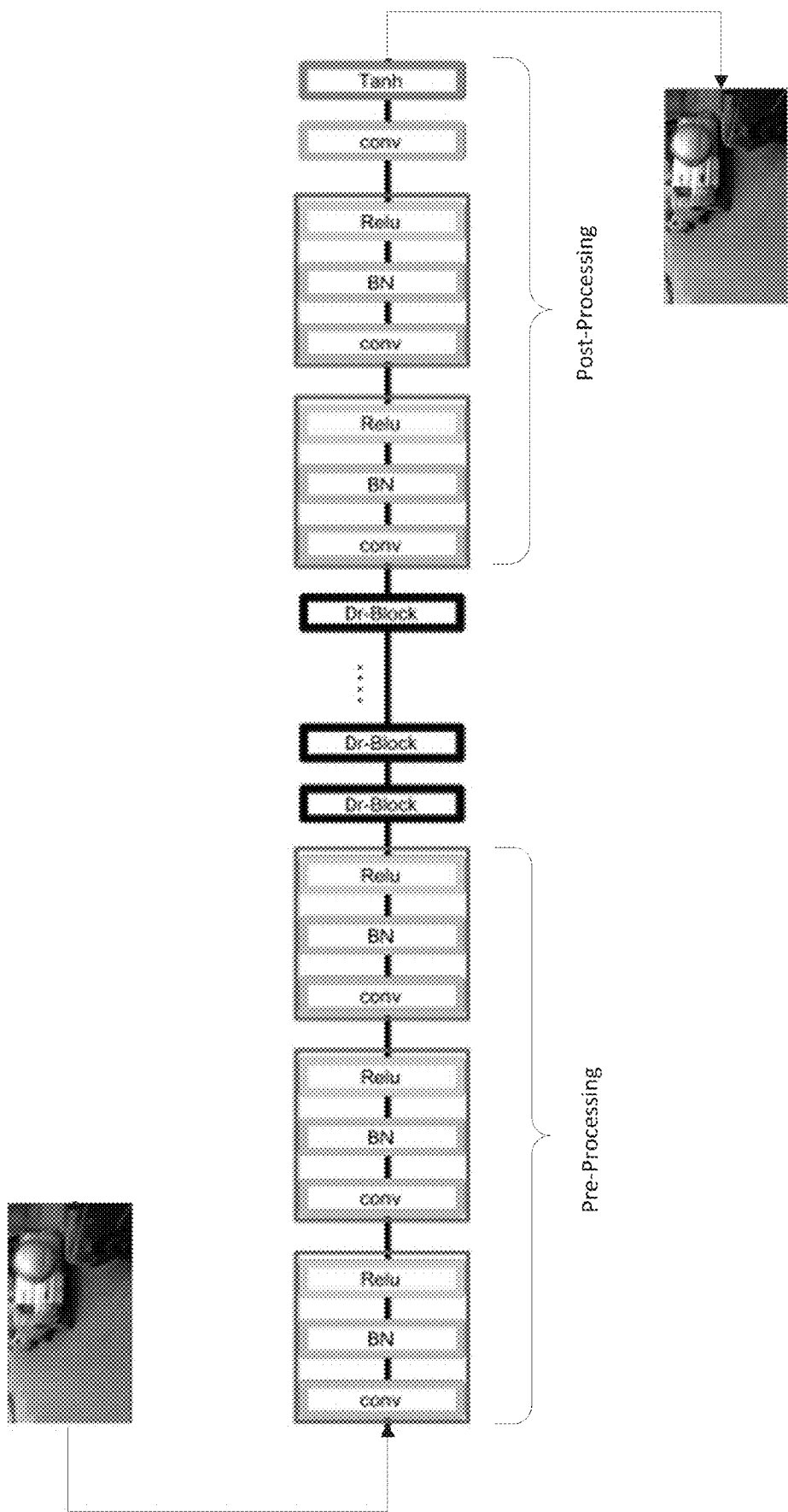
FIG. 5 is a graphical representation of the DR-Net comprising multiple DR-Blocks coupled with pre-processing and post-processing stages.

The final architecture of the proposed network is illustrated in FIG. 5, showing the pre-processing and post-processing stages coupled to a DR-Net comprising multiple DR-Blocks.

The loss function for DR-Net is formulated as a combination of the classical $l_2$ loss and generative adversarial network (GAN) loss, as expressed by Eq. (9):

$$L(x,y)=\|x-y\|_2^2+\mu L_{GAN}(x,y) \quad (9)$$

In one embodiment, μ=0.01 works well in practice. The $l_2$ error is known to be a good metric for image recovery, but the recovered images usually suffer from blurry artifacts, as the $l_2$ error tends to ignore high-frequency components in the image. To remedy this, the GAN loss is added to the loss function to more faithfully reconstruct high-frequency elements. GANs have been well studied and used in practice to better model the space of real-world images with the help of a discriminator network. This discriminator forces the generator to only operate in the space of real-world images, thereby providing better modelling. Moreover, the GAN loss has been used in several image recovery tasks, such as image super-resolution, because GAN loss forces the generator to recover photo-realistic textures from corrupted images.

Figures 6A, 6B, 6C:
FIGS. 6A-6C are an example of a comparison between an image processed in accordance with the method of the present invention using only classical ($l_2$) loss and an image processed using both classical loss and GAN loss.

In one embodiment of the present invention, the Wasserstein-GAN, with its gradient penalty, is used, owing to its more robust tolerance towards the balance between the discriminator and the generator, leading to more stable training. FIGS. 6A-6C show the advantage of adding GAN loss to the classical loss. As can be seen. the Hum artifacts are reduced when GAN loss is used. FIG. 6(A) shows the blurry image. FIG. 6(B) shows the recovered image when only the $I_2$ loss is applied, and FIG. 6(C) shows the recovered image when both the $I_2$, loss and GAN loss are applied. The areas of each photo enclosed in the boxes are shown enlarged directly below each photo.

In one embodiment of the present invention, the method simulates more realistic blurring kernels. To build an accurate model for kernel generation, it is useful to better understand the causes of blurring. There are three main sources of blur: defocusing, diffraction and motion. Thus, a model is built which simulates blurring which is caused by the three effects. The following process is used:

$$y=k_m * k_{op} * x \quad (10)$$

where:
$k_m$ is the motion kernel; and
$k_{op}$ is the optical blurring filter.

Figure 7:
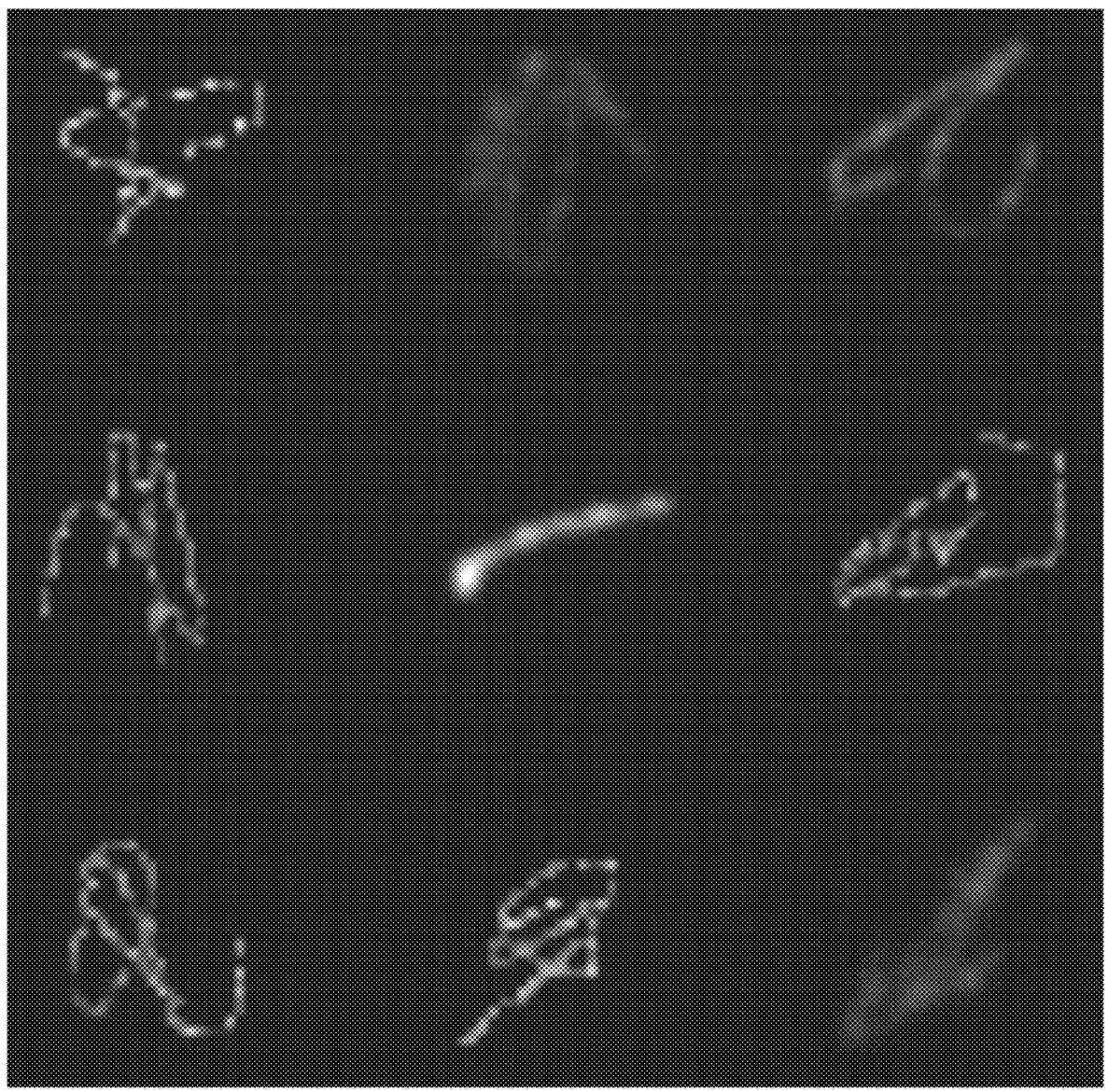
FIG. 7 shows examples of blurring filters generated randomly by the method of the present invention.

FIG. 7 shows samples of the generated kernels $k_m * k_{op}$. The simulated blurred image is generated based on Eq. (10), where the clear image is convolved with an optical blurring filter (i.e., a Gaussian filter with random variance) before being convolved with the proposed motion kernel. FIG. 7 shows blurring filters generated randomly by the method. Note that the kernels not only have the motion blur component to them (random jagged lines), but also optical blur (i.e., the motion kernels themselves are blurred).

A defocused image is often produced by convolving the focused image with a blurring filter. The blurring filter can be represented by a low-pass filter where the bandwidth of the filter is related to the f-number of the lens and the distance between the target and the camera. Likewise, diffraction can be modeled by convolving the sharp image with a low-pass filter as well.

The optical blurring kernel can be modelled with a Gaussian filter that has variance which is generated from a uniform distribution between 0 and 3. This results in a low-pass filter which simulates optical blur. The variance is assumed to be random because the bandwidth of the optical filter is not known. This allows the training of the network to deal with a large set of kernels.

The motion filter is produced by distributing a random number of points randomly on a 2D grid (between 4 and 10). A piece-wise cubic polynomial function is then used to fit a line through the sampled points. The values on this line are generated from the normal distribution, where negative values are zeroed and the length of the motion kernel is normalized.

In Eq. (10), the blurry image is generated with both filters (motion and optical). To simulate the case when only one of these filters is active (e.g. when the camera is stable but out of focus), $k_{op}$ and $k_m$ are forced to be a delta function with no shift 25% of the time for each filter. Finally, the clear image is applied to the blurring kernel partially (e.g. 50-95% of the image) to simulate spatially varying blurring filters, which exist in the real applications.

In one embodiment, the configuration of the deep network, is as shown in FIG. 5 with the number of DR-Blocks (iterations) set to 5. In this embodiment, all convolutional layers use filters of the size 3×3. As it is desirable to have the sizes of all feature maps in the network to be similar to the input image size, sufficient zero-padding is performed.

In one implementation of the invention, for training, 800 images from the DIV2K dataset were used as training data. For each batch, 16 patches of the size 128×128 were sampled from, one from each of 16 images. The training data can be augmented by scaling, rotation and flipping. In total, about 300,000 patches were generated. The input to the network comprised the blurred patches, and the ground truth output comprised the clean versions of the patches.

The Douglas-Rachford iterations within DR-Net can solve blind image deconvolution problems. The invention includes novel aspects such as modelling both the data fidelity and the image prior proximal operators with convolutional neural networks for use in the Douglas-Rachford iterations.

The invention claimed is:

1. A computer-implemented method for performing blind deconvolution of corrupted images comprising:
  iteratively performing a minimization of a sum of a data fidelity term and an image prior term using a Douglas-Rachford algorithm;
  wherein a proximal operator of the—data fidelity term is represented in each iteration by a deep neural network trained to approximate the data fidelity proximal operator;
  wherein a proximal operator of the image prior term is represented in each iteration by a deep neural network trained to approximate the image prior proximal operator; and wherein the deep neural network trained to approximate the data fidelity proximal operator is different for each iteration and further wherein the deep neural network trained to approximate the image prior proximal operator is different for each iteration.

2. The method of claim 1 further comprising:
using the corrupted image as an input image to a first iteration;
wherein each subsequent iteration takes as the input image an output from the previous iteration.

3. The method of claim 2 further comprising:
filtering the corrupted image with a pre-processing network prior to using it as the input for the first iteration, the pre-processing network providing an initial estimate of the deconvolution of the corrupted image.

4. The method of claim 3 further comprising:
filtering the output of the one of more iterations with a post-processing network for converting a tensor output of the one or more iterations into an image.

5. The method of claim 1 wherein each iteration performs the steps of:
approximating the data fidelity proximal operator as a function of the input image;
approximating the image prior proximal operator as a function of the data fidelity proximal operator and the input image; and
calculating an output image as the sum of the input image and a product of a step size and a sum of the data fidelity and image prior proximal operators;
wherein the output image is used as the input image for a next iteration or as the output image after a last iteration.

6. The method of claim 1 wherein the deep neural network for approximating the proximal operators of the data fidelity and image prior terms are trained by:
inputting blurred patches from a plurality of images to a deep neural network; and
setting the ground truth output of the neural network to the unblurred patches.

7. A network architecture for performing blind deconvolution of corrupted images comprising:
one or more layers, each layer performing a minimization of a sum of a data fidelity term and an image prior term;
wherein each layer performs the minimization using a Douglas-Rachford algorithm based on a proximal operator of the data fidelity term and a proximal operator of the image prior term;
wherein the proximal operator of the data fidelity term is approximated with a data fidelity convolutional network;
wherein the proximal operator of the image prior term is approximated with an image prior convolutional network; and
wherein the data fidelity convolutional network trained to approximate the data fidelity proximal operator is different for each layer and further wherein the image prior convolutional network trained to approximate the image prior proximal operator is different for each layer.

8. The architecture of claim 7:
wherein the first layer takes as input the corrupted image; and
wherein each subsequent layer takes as input an output from the previous layer.

9. The architecture of claim 8 wherein the image prior convolutional network comprises:
a first convolutional layer;
a rectified linear unit; and
a second convolutional layer.

10. The architecture of claim 9 wherein the data fidelity convolutional network comprises:
a third convolutional layer;
a rectified linear unit; and
a fourth convolutional layer;
wherein an output of the fourth convolutional layer is added to a convolution of the corrupted image to produce an output of the data fidelity convolutional network.

11. The architecture of claim 7 wherein the Douglas-Rachford algorithm is embodied by the equation:

$$x^{k+1} = x^k + \lambda_k(z^k - q^k)$$

where:
$\lambda_k$ is the step size for layer k;
$x^k$ is the input image from the previous layer;
$z^k$ is the proximal operator for the image prior term; and
$q^k$ is the proximal operator for the data fidelity term.

12. The architecture of claim 7 further comprising:
a preprocessing network for providing an initial estimate of the deconvolution of the corrupted image; and
a post-processing network for converting a tensor output of the one or more layers into an image.

13. The architecture of claim 12 wherein the preprocessing network comprises:
three stages, each stage comprising:
a convolutional layer having a plurality of 3x3 filters;
a batch normalization; and
a rectified linear unit;
wherein:
a first stage has $$\frac{N}{4} 3 \times 3$$

filters;
a second stage has $$\frac{N}{2} 3 \times 3$$

filters; and
a third stage has N 3×3 filters.

14. The architecture of claim 13 wherein the preprocessing post-processing network comprises:
two stages, each stage comprising:
a convolutional layer having a plurality of 3x3 filters;
a batch normalization; and
a rectified linear unit;
a convolutional layer having 1 or 3 3×3 filters; and
a tanh activation function;
wherein:
a first stage has $$\frac{N}{4} 3 \times 3$$

filters; and a second stage has $$\frac{N}{2} 3\times 3$$

filters.

15. The architecture of claim 7 wherein the corrupted image is a non-linear sum of i basis elements and wherein the minimization for each element can be performed in parallel.

16. The architecture of claim 15 wherein each minimization is performed in a distinct channel in a distinct convolution layer in the network.

17. The architecture of claim 7 wherein the network has a loss function that is a sum of an $l_2$ loss and a GAN loss.

18. The architecture of claim 17 wherein GAN loss is a Wasserstein-GAN.

\* \* \* \* \*